United States Patent
Oh et al.

(10) Patent No.: US 7,593,022 B2
(45) Date of Patent: *Sep. 22, 2009

(54) STRUCTURE-PRESERVING CLONE BRUSH

(75) Inventors: Byong Mok Oh, Newton, MA (US); Fredo Durand, Boston, MA (US)

(73) Assignee: EveryScape, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/951,355

(22) Filed: Dec. 6, 2007

(65) Prior Publication Data
US 2008/0088641 A1 Apr. 17, 2008

Related U.S. Application Data

(63) Continuation of application No. 10/601,842, filed on Jun. 23, 2003, now Pat. No. 7,327,374.

(60) Provisional application No. 60/466,628, filed on Apr. 30, 2003.

(51) Int. Cl.
G09G 5/00 (2006.01)
(52) U.S. Cl. .................. 345/611; 345/617; 345/426
(58) Field of Classification Search ............... 345/611, 345/617, 426
See application file for complete search history.

(56) References Cited
U.S. PATENT DOCUMENTS

| | | | | |
|---|---|---|---|---|
| 4,898,537 A | * | 2/1990 | Pryor | |
| 5,054,008 A | * | 10/1991 | Darling | |
| 5,475,507 A | * | 12/1995 | Suzuki et al. | |
| 5,798,761 A | * | 8/1998 | Isaacs | |
| 5,818,415 A | * | 10/1998 | Shirakawa | |
| 5,835,241 A | * | 11/1998 | Saund | |
| 6,073,056 A | * | 6/2000 | Gawronski et al. | |
| 6,198,852 B1 | * | 3/2001 | Anandan et al. | |
| 7,003,150 B2 | * | 2/2006 | Trajkovi | |
| 7,199,793 B2 | | 4/2007 | Oh et al. | |
| 7,327,374 B2 | | 2/2008 | Oh et al. | |
| 2003/0086627 A1 | * | 5/2003 | Berriss et al. | |
| 2004/0196282 A1 | | 10/2004 | Oh | |
| 2006/0132482 A1 | | 6/2006 | Oh | |
| 2008/0143727 A1 | | 6/2008 | Oh et al. | |

* cited by examiner

*Primary Examiner*—Kee M Tung
*Assistant Examiner*—Michelle K Lay
(74) *Attorney, Agent, or Firm*—Sunstein Kann Murphy & Timbers LLP

(57) ABSTRACT

The invention provides tools and techniques for clone brushing pixels in an image while accounting for inconsistencies in apparent depth and orientation within the image. The techniques do not require any depth information to be present in the image, and the data structure of the image is preserved. The techniques allow for color compensation between source and destination regions. A snapping technique is also provided to facilitate increased accuracy in selecting source and destination positions.

32 Claims, 13 Drawing Sheets

STRUCTURE-PRESERVING CLONE BRUSH

CROSS-REFERENCE TO RELATED APPLICATIONS

This application claims the benefit of U.S. patent application Ser. No. 10/601,842, filed Jun. 23, 2003, now allowed, entitled "Structure Preserving Clone Brush." This application also claims priority from U.S. Provisional Application No. 60/466,628, entitled "Image-Based Modeling and Photo Editing", filed Apr. 30, 2003. Each of these applications is incorporated by reference herein in its entirety.

FIELD OF INVENTION

The invention relates generally to computer graphics. More specifically, the invention relates to a system and methods for editing images while preserving the data structure of the images.

BACKGROUND

One of the most powerful and widely-used tools in photo editing is the clone brush, also known as the "clone stamp." The clone brush permits interactive copying and pasting from one region of an image to another via a brush interface. It is often used to remove undesirable portions of an image, such as blemishes or distracting objects in the background, or to replicate parts of a photograph. The brush interface facilitates fine user control, and interactively copying and pasting existing pixels enables the user to maintain photo-realism even with drastic modifications.

Despite its utility and versatility, the traditional clone brush suffers from several important limitations. First, only regions with similar orientation and distance with respect to the camera can be brushed effectively. Perspective foreshortening present in most photographs and various shapes of the objects in the scene make it difficult to clone brush effectively. Although the traditional clone brush works well for regions of an image that do not have a strong geometric structure, such as clouds or vegetation, many structured features are not amenable for the traditional clone brush due to perspective foreshortening, such as buildings or tiled floors.

Second, intensity variations due to existing lighting in the photograph further limit the effectiveness of the traditional clone brush. Artifacts appear when the intensity of the source and destination regions do not match. Only regions with similar intensities can be clone brushed convincingly using the traditional clone brush.

Third, it may be difficult to manually align the source and destination positions using a traditional clone brush. Misalignment between source and destination features leads to noticeable artifacts at the limit of the clone-brushed region. A precise initialization of source and destination points is often necessary, especially for images that have structured features, such as edges. It is common for the user to undo and repeat the initialization step until the points are sufficiently accurate.

While numerous software packages (such as ADOBE PHOTOSHOP, by Adobe Systems Incorporated, of San Jose, Calif.) provide clone brushing capabilities in an image-editing environment, none of these packages adequately addresses the problems of perspective foreshortening, color correction, or accurately aligning source and destination positions.

What is needed, therefore, is editing software which allows clone brushing that accounts for perspective foreshortening and lighting differences within the image. A need further exists for editing software that allows a user to accurately align source and destination positions for clone brushing.

SUMMARY OF THE INVENTION

The invention provides a structure-preserving clone brush in a purely 2D photo editing context, where no depth information is necessary. This tool can easily be integrated into existing 2D photoediting systems, such as ADOBE PHOTOSHOP, to improve the traditional clone brush.

The invention provides at least three enhancements to improve the 2D version of the traditional clone brush. First, the invention allows the user to correctly copy and paste pixels according to the perspective foreshortening present on planar surfaces of the input image. The user provides perspective information by tracing parallel lines in the image.

Second, the invention provides a simple color-correction technique that allows the user to clone brush seamlessly between parts of the image that have different lighting conditions, by using a multiplicative factor to compensate for the intensity variation.

Furthermore, the invention provides a "snapping" feature that allows the user to initialize the source and destination positions more precisely. The new "snapping" feature optimizes the initial destination point to match features of the initial source point, thus providing precise initial points.

In accordance with one aspect of the invention, a method is provided for clone-brushing in an image while accounting for perspective and orientation differences within the image. The method comprises specifying a world plane, providing source and destination positions, identifying a destination region relative to the destination position, determining a source region relative to the world plane and corresponding to the destination region, transforming image information of the source region relative to the world plane to image information of the destination region, and copying the transformed image information to the destination region.

In some embodiments, the source region is determined via a homography defined by the world plane.

In some embodiments, the world plane is specified by drawing two sets of parallel lines.

In some embodiments, a bilinear interpolation is applied to image information for the source region relative to the world plane.

In some embodiments, a first color region is provided for the source region, a second color region is provided for the destination region, a color ratio is computed for the color regions, and the color ratio is applied during the transformation of image information from the source region to the destination region. In one version, the color ratio is computed using Gaussian weighted averages of the first and second color regions. In one version, the first color region is provided with respect to the world plane.

In some embodiments, a second world plane and a relative scale factor are specified, the source region is determined relative to the first world plane and corresponding to the destination region relative to the second world plane and the relative scale factor, and the image information is transformed relative to the first world plane to image information for the destination region relative to the second world plane and the relative scale factor. In one version, the second world plane is specified by drawing a pair of parallel lines. In one version, the relative scale factor is specified by drawing a line segment of unit length relative to the first world plane and drawing a line segment of unit length relative to the second world plane.

In accordance with another aspect of the invention, a clone-brushing method is provided that compensates for color variation between regions of the image. The method comprises providing first and second color sample regions, computing a color ratio between the color sample regions, providing source and destination positions in the image, identifying a destination region relative to the destination position, determining a source region corresponding to the destination region, applying the color ratio to image information of the source region and transforming the image information of the source region to image information of the destination region, and copying the transformed image information to the destination region. In some embodiments, the color ratio is computed using Gaussian weighted averages of the color sample regions.

In accordance with another aspect of the invention, a clone-brushing method is provided for snapping an initial destination position to a more accurate destination position relative to the source position. The method comprises providing a source and initial destination position in the image, determining a snapped destination position, identifying a destination region in the image relative to the snapped destination position, determining a source region in the image corresponding to the destination region, transforming image information of the source region to image information of the destination region, and copying the transformed image information to the destination region.

In some embodiments, the snapped destination is determined by searching a collection of candidate destination positions. In one version, a quality metric is applied to the candidate destination positions and a candidate whose quality is similar the quality of the source position is determined to be the snapped destination position. In one version, the quality metric for a position is a Gaussian weighted color average for a region surrounding the position. In one version, the quality metric compensates for regional color variation by applying a color ratio.

BRIEF DESCRIPTION OF THE DRAWINGS

The above and further advantages of the invention may be better understood by referring to the following description taken in conjunction with the accompanying drawings, in which.

DETAILED DESCRIPTION

Figure 1:
FIG. 1 illustrates a typical application of a traditional clone brush tool.
Figure 1:

To use a traditional clone brush, a user first selects a "source region" of the image and then paints over a "destination region" using a brush interface that copy-pastes pixels from the source to the destination. The use of a traditional clone brush is shown in FIG. 1, where the clone brush has been used to remove the partial image of a woman from the image.

An important concept of the traditional clone brush is the relative translation. Before clone brushing starts, the user selects the initial source and destination points, s and d respectively, to define the relative translation, $T_r$, computed in the image plane. As the clone brushing progresses, $T_r$ determines the position of the source region with respect to the currently-being-brushed destination region. The equation to determine the location of the source pixel, $x_s$, relative to the current destination pixel, $x_d$, is $$x_s = T_r x_d. \tag{1}$$

The color of pixel $x_s$ is then copied to the pixel $x_d$.

A more general formulation of Equation (1) is $$x_s = M_r x_d. \tag{2}$$

The matrix $M_r$ is a similarity transformation matrix, where $M_r = T_r R_r S_r$. $T_r$ is the relative translation, $R_r$ is the relative rotation, and $S_r$ is the relative uniform scaling that would allow the user to clone brush rotated and scaled pixels from the source to the destination region in the image plane. This feature is not available in traditional photo-editing software.

Figure 2B:
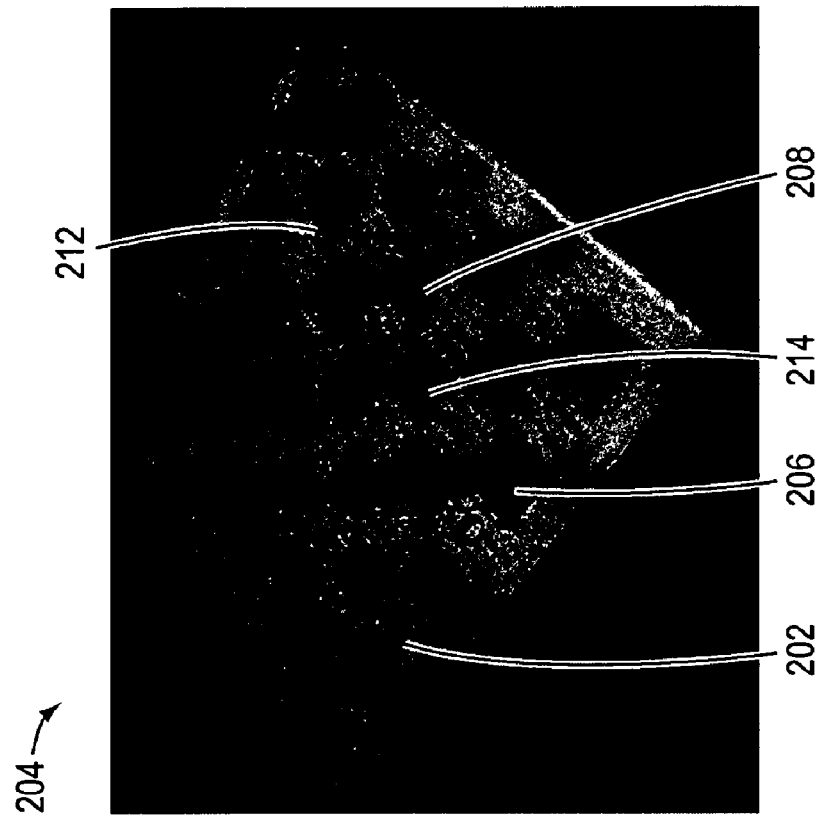
FIG. 2 illustrates a relative translation and problems of perspective foreshortening inherent in the use of a traditional clone brush.
Figure 2A:
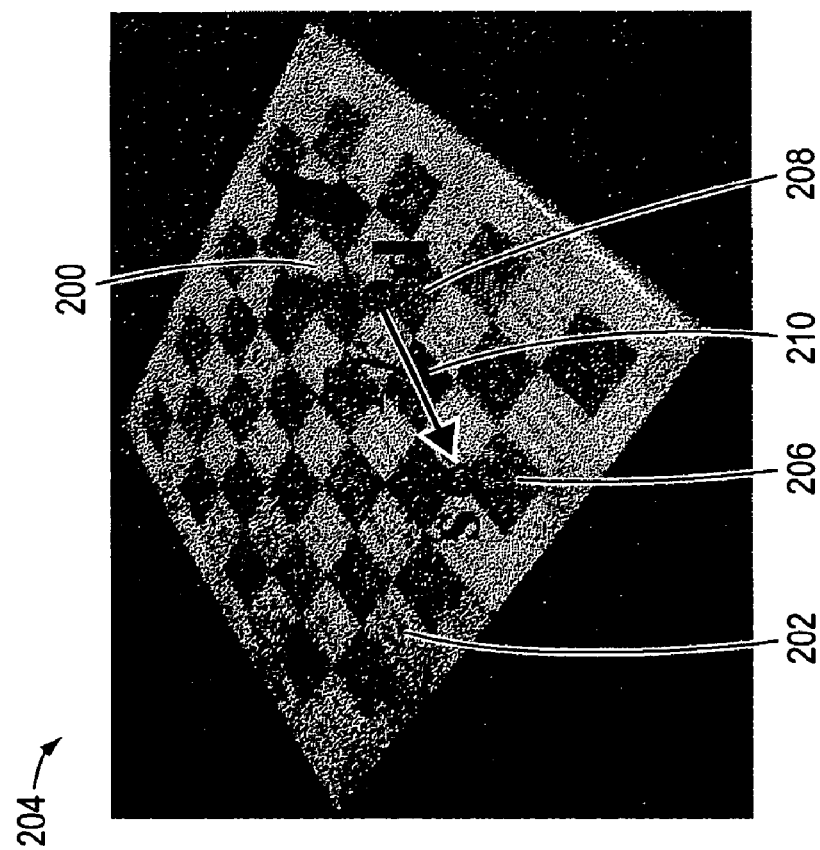

An exemplary application of relative translation in a traditional clone brush operation is seen in FIG. 2. The traditional clone brush is to be used in this example to remove the chess pieces 200 from the chessboard 202 in the image 204. The user in this example has chosen a source position s 206 and a destination position d 208. This defines the relative translation $T_r$ 210. As the user moves the cursor relative to the destination position d 208, the corresponding position relative to the source position s 206 is determined by the relative translation $T_r$. Pixels are copied to the destination area 212 from the corresponding source area 214. As noted previously, one of the main problems in clone brushing stems from perspective foreshortening. This is seen in FIG. 2b, where the copied source region 214 does not appear to fit correctly within the destination region 212.

Figure 3:
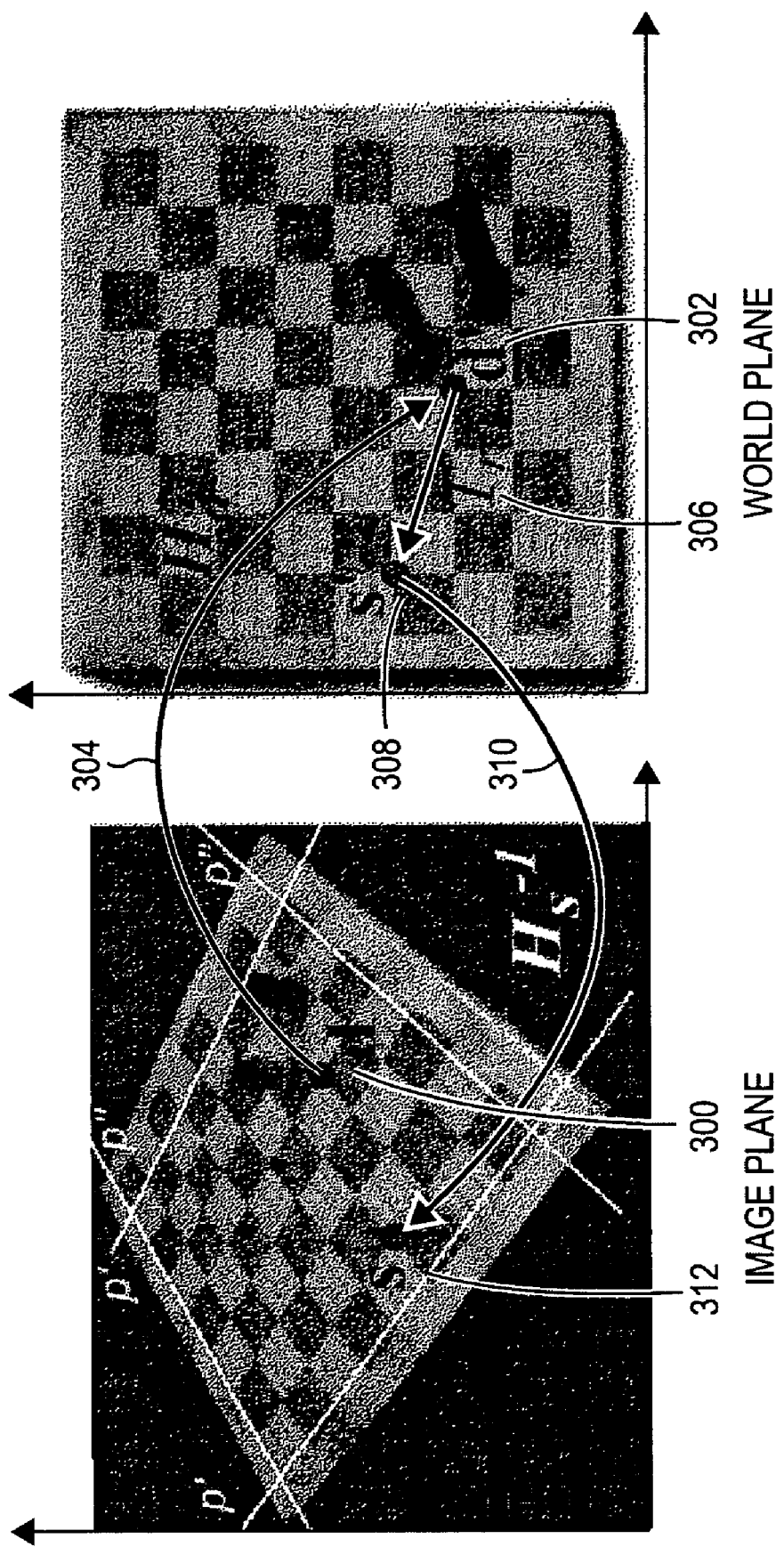
FIG. 3 illustrates the use of homographies to apply a relative translation in a defined world plane, in accordance with an embodiment of the invention.

One aspect of the invention corrects the perspective distortions on planar and quasi-planar surfaces that are inherent in the use of the traditional clone brush. The traditional clone brush, as noted above, is based on relative translation in image space. In the case of foreshortened geometry, it is desirable for the translation to take place in world space, as shown in FIG. 3. In an embodiment of the invention, this is accomplished by defining the world plane using a homography—a linear 2D-to-2D mapping between the world and image planes. Once the homography is determined, points on the image plane can be mapped to the world plane, and vice versa. A preferred embodiment of the invention does not rectify images—rather, only the transformations that determine the perspective-correcting coordinates of source pixels given destination pixel locations are computed. The pixel copy of source color to the destination position then occurs in the image plane. In the example of FIG. 3, destination position d 300 in the image plane is mapped to world plane destination position d' 302 via homography $H_d$ 304. Relative translation $T_r$ 306 then maps d' 302 to world plane source position s' 308. The inverse homography $H_s^{-1}$ 310 then maps s' 308 back to image plane source position s 312. The pixels at s 312 are then copied to d 300.

It is useful to discuss two types of clone-brushing scenarios: 1-plane and 2-plane. The 1-plane scenario is when the source and destination regions reside on the same world plane. For instance, to remove the chess pieces from the chessboard in FIG. 3, only a single homography need be specified; homographies $H_d$ and $H_s$ are identical, mapping from the image plane to the world plane. The 2-plane scenario is when the source and destination regions reside in different world planes, e.g., clone brushing from one side of a building to another. In this case, homographies for both source and destination world planes need to be specified, and additional parameters are necessary to determine the relationship between the two planes. In FIG. 3, if the source s 312 and destination d 300 were located on different world planes within the image, then homography $H_d$ 304 and inverse homography $H_s^{-1}$ 310 would not represent the same homography: $H_d$ 304 would map from the image plane to the world plane containing d 300, while $H_s^{-1}$ 310 would map from the world plane containing s 312 to the image plane.

Figure 4B:
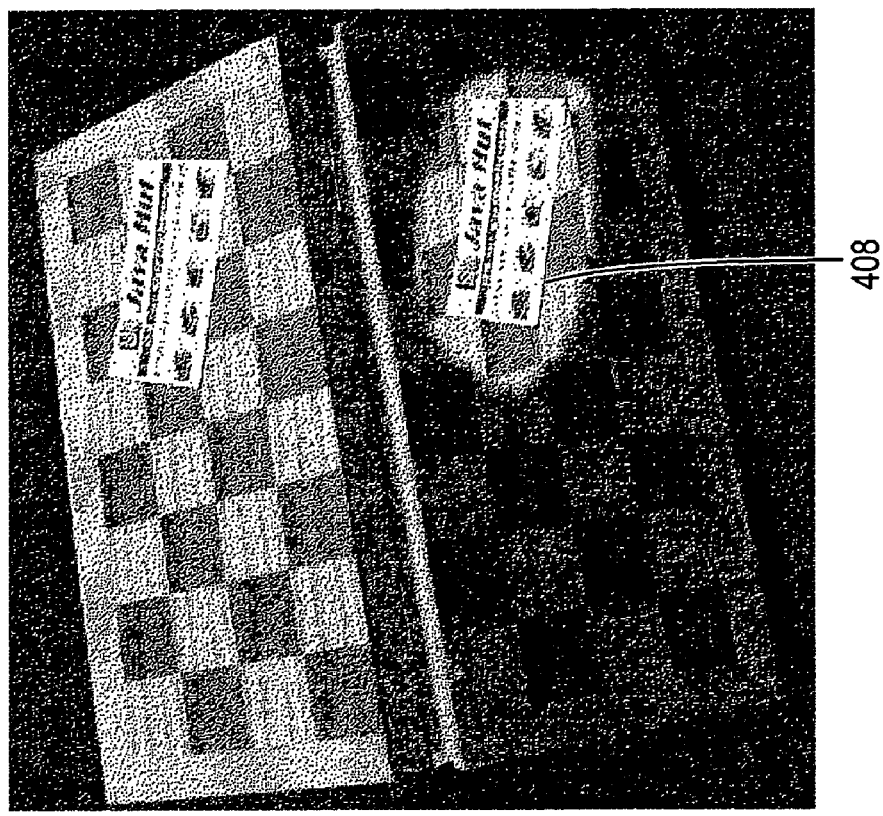
FIG. 4 illustrates a two-plane scenario for a structure-preserving clone brush in accordance with an embodiment of the invention, along with the problems of perspective foreshortening, misorientation and miscoloration inherent in the use of a traditional clone brush.
Figure 4A:
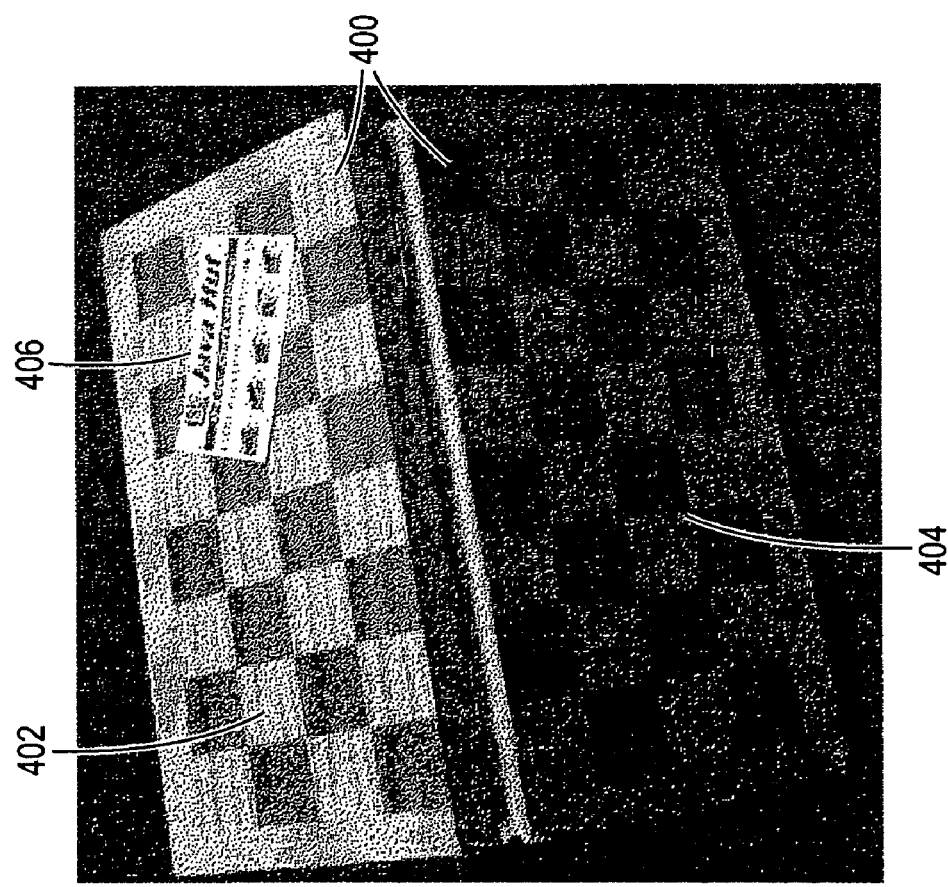

An example of the 2-plane scenario is seen in FIG. 4, where the chessboard 400 is partially folded into two distinct halves: a horizontal half 402 and a vertical half 404. If a traditional clone brush is used to copy the paper 406 from the horizontal half 402 to the vertical half 404, the result will be similar to that of FIG. 4b, where the copied area 408 requires perspective correction relative to the planes defined by both the horizontal half 402 and the vertical half 404. Additionally, color correction is required due to the lighting variation between the horizontal half 402 and the vertical half 404.

Figure 5:
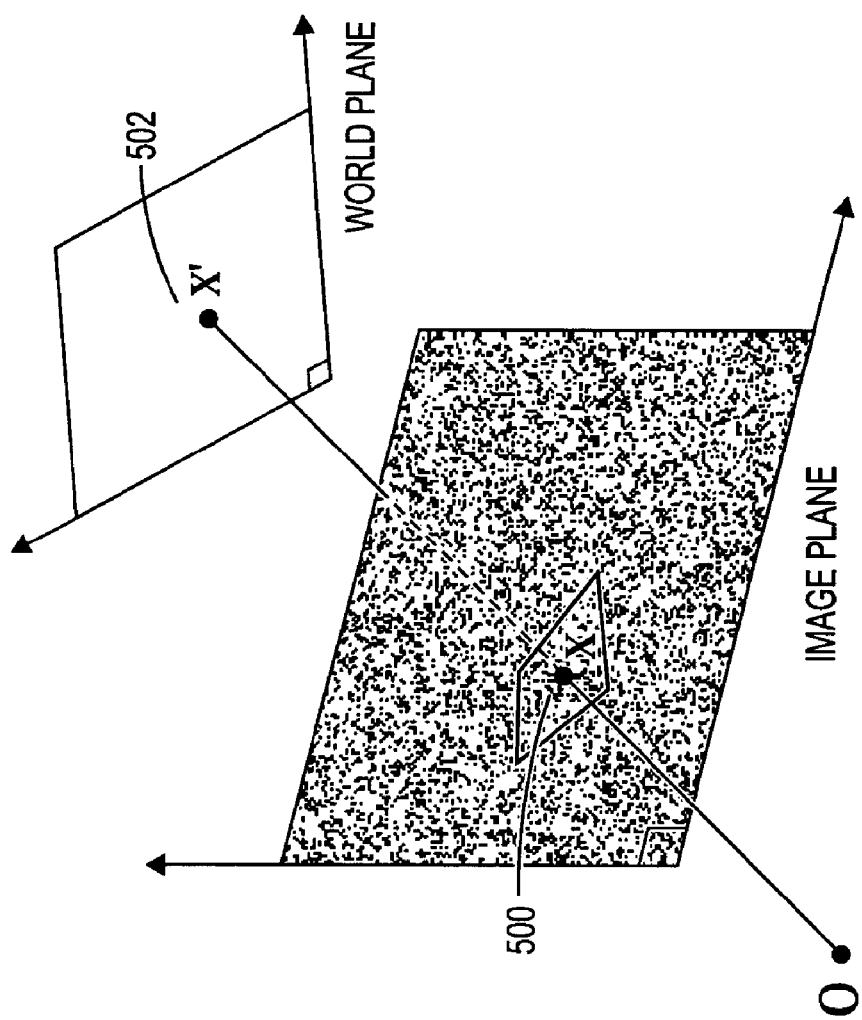
FIG. 5 illustrates a homography that linearly transforms points in the image plane to points in the world plane, in accordance with an embodiment of the invention.

As illustrated in FIG. 5, points on the world plane are projections of points on the image plane, and this linear mapping between the two planes is defined through a homography, i.e. a 2D projective transformation. More specifically, the homography is represented by a 3×3 homogeneous matrix H. Points on the image plane x 500 are mapped to the points on the world plane x' 502 as x'=Hx up to a scale factor, where x is a homogenous column 3-vector $x=(x,y,1)^T$. Similarly, the inverse homography, $H^{-1}$, maps points from the world plane back to the image plane, $x=H^{-1}x'$.

The homography matrix H can be decomposed into the following transformation matrices:

$$H=MN. \quad (3)$$

The matrix M is a similarity transformation, which is also known as the metric component of the homography, $$M=T(t_x,t_y)R(\theta)S(s), \quad (4)$$

which has four degrees of freedom: translation matrix T with translation vector $t=(t_x, t_y, 1)^T$, rotation matrix R with angle θ, and scale matrix S with uniform scale factor s.

The second non-metric component, N, determines the rectified world-plane coordinates. The matrix N can be further decomposed into N=AP, where A is an affine transformation, $$A = \begin{bmatrix} a & h & 0 \\ 0 & 1 & 0 \\ 0 & 0 & 1 \end{bmatrix}, \quad (5)$$

which has two degrees of freedom: a determines the width-to-height aspect ratio, and h determines the shear transformation along the x-axis.

Figure 6A:
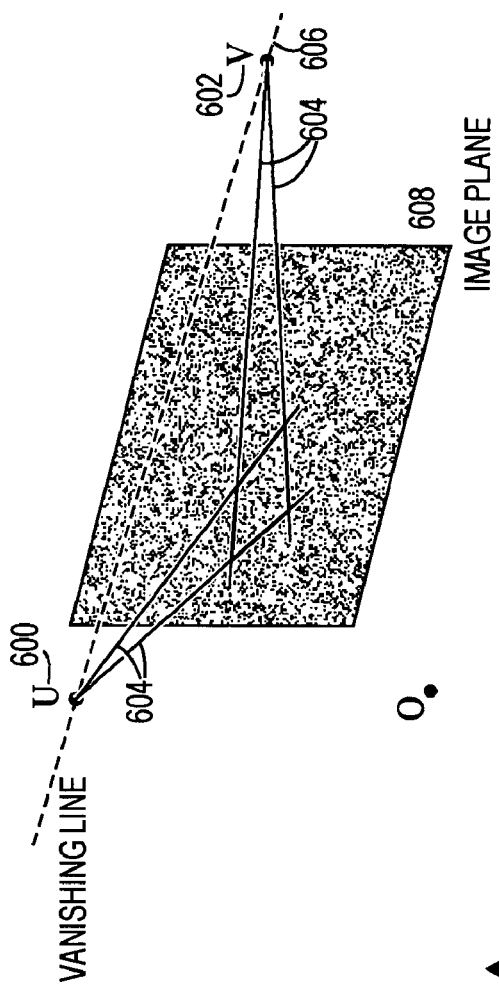
FIG. 6 illustrates the determination of a vanishing line and focal length, as used in computing a planar transformation, in accordance with an embodiment of the invention.
Figure 6B:
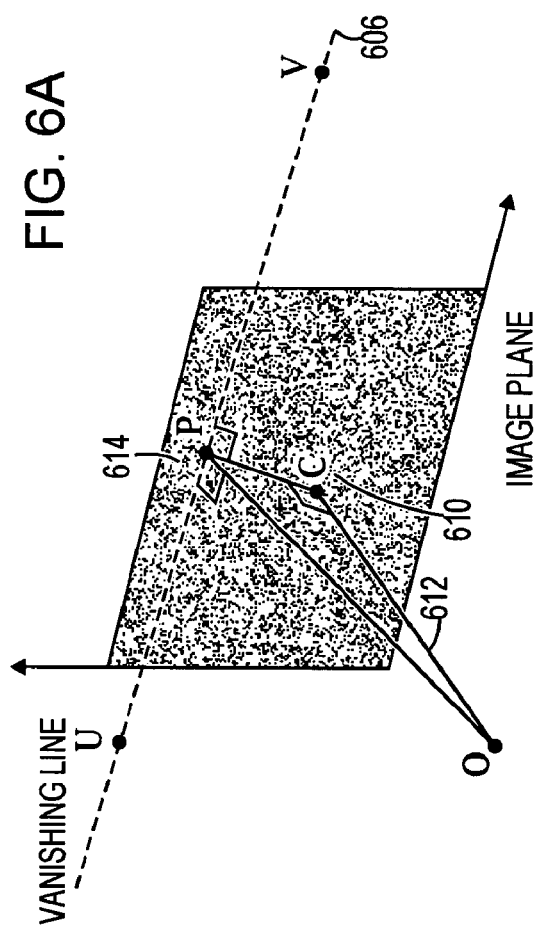

Matrix P represents a "pure projective" transformation:

$$P = \begin{bmatrix} 1 & 0 & 0 \\ 0 & 1 & 0 \\ l_1 & l_2 & 1 \end{bmatrix}, \quad (6)$$

where vector $l=(l_1, l_2, 1)^T$ is the vanishing line of the world plane, that is, the horizon. Parallel lines on the world plane intersect at a vanishing point on the image plane, and these vanishing points lie in l. This is seen in FIG. 6, where points u 600 and v 602 are vanishing points for parallel lines 604 on the image plane 608.

Only N is necessary to metric rectify an image, i.e., correctly represent angles and length ratios up to a scale factor in the world plane. Matrix M does not play a role in image rectification, but is applied to rotate, uniform scale, and translate the image in its world plane.

Unlike the traditional clone brush, the perspective-correcting clone brush of the present invention uses a relative transformation $M_r$ that takes place in the world-plane coordinates. Similar to Equation (2), the following formulation is used in a preferred embodiment to compute $x_s$ on the image plane:

$$x_s=H_s^{-1}M_rH_dx_d, \quad (7)$$

where $H_s$ and $H_d$ are the source and destination homographies, respectively. More intuitively, $H_d$ maps $x_d$ to the destination world plane, $M_r$ applies the relative transformation to the corresponding position on the source world plane, then $H_s^{-1}$ inverse maps the point back to the source region in the image plane. As the clone brushing progresses, the color of pixel $x_d$ is replaced by the color of the source pixel $x_s$ on the image plane, which corrects the perspective foreshortening problem. In a preferred embodiment, the color of the source pixel $x_s$ on the image plane is bilinearly interpolated before being copied to $x_d$.

In using the formulation in Equation (7), the metric components of both homographies can be ignored, i.e., H=N. The non-metric part alone sufficiently defines the world plane for the perspective correction. Furthermore, the transformation matrix $M_r$ applies the relative translation, rotation, and scale necessary to relate the two planes.

For the 1-plane scenario, the source and destination homographies are the same, i.e. $H_s=H_d$, so the user only needs to specify one homography. The user draws two orthogonal pairs of parallel lines in the input image to specify a homography. This can be seen in FIG. 3, where parallel lines p' and parallel lines p" have been drawn. In most architectural scenes, these visual cues are commonplace. Alternatively, other techniques could be used to determine the homography, such as those described by Liebowitz and Zisserman in "Metric rectification for perspective images of planes," in *Proceedings of the Conference on Computer Vision and Pattern Recognition,* 1998, and by Liebowitz et al. in "Creating architectural models from images," *Computer Graphics Forum* 18, 3 (September), pp. 39-50. For non-planar geometry, other techniques could be used locally to infer orientation of the surface, such as those described by Zhang et al. in "Single view modeling of free-form scenes," in *IEEE Computer Vision and Pattern Recognition,* 2001.

The two sets of parallel lines drawn by the user specify vanishing points u and v. As shown in FIG. 6, the vanishing line l 606 passes through u 600 and v 602, where $l=(l_1, l_2, 1)^T=u\times v$. Once l is identified, the matrix P is determined (Equation (6)).

The parameters a and h of matrix A (Equation (5)) are determined by solving the following quadratic equation for the complex number I:

$$(1 + 2c_x l_1 + l_1^2(c_x^2 + c_y^2 + f^2))I^2 + 2(l_2 c_x + l_1 c_y + l_1 l_2(c_x^2 + c_y^2 + f^2))I + \qquad (8)$$
$$2l_2 c_y + l_1 c_y + l_2^2(c_x^2 + c_y^2 + f^2) + 1 = 0,$$

where $I=\alpha\square-i\beta$, $\alpha=1/\beta$, and $s=-\alpha/\beta$. The principal point 610, $c=(c_x, c_y)$, is assumed to be in the center of the image 608. The only unknown parameter is then the focal length f. The length of the line segment f=oc 612 is determined as follows:

$$f=\overline{oc}=\sqrt{\overline{op}^2-\overline{cp}^2}. \qquad (9)$$

Point p 614 is the orthogonal projection of c 610 onto the vanishing line l 606 in image-plane coordinates. The length of line segment $$\overline{op}=\sqrt{\overline{up}\cdot\overline{pv}}. \qquad (10)$$

Specifying two orthogonal sets of lines defines the non-metric part of the homography, N=AP. Therefore, the homographies $H_s=H_d=N$. In one embodiment of the invention, the user then defines the relative translation, $T_r$, by specifying the initial source and destination points, as is the case with the traditional clone brush. The matrix $T_r$ is now computed in world-plane coordinates, i.e. from $t_r=s'-d'$, where $s'=H_s s$ and $d'=H_d d$, as discussed above with reference to FIG. 3. Matrices $R_r$ and $S_r$ are irrelevant in this case, since $H_s=H_d$, meaning their values do not affect the clone brushing. As a result, $M_r=T_r$, and Equation (7) is complete for the 1-plane scenario.

In accordance with an embodiment of the invention, the 2-plane scenario begins similarly to the 1-plane scenario, in that the user first draws a pair of orthogonal parallel lines for both source and destination planes. These determine the non-metric components and, therefore, the respective homographies, $H_s=N_s$ and $H_d=N_d$.

Figure 7B:
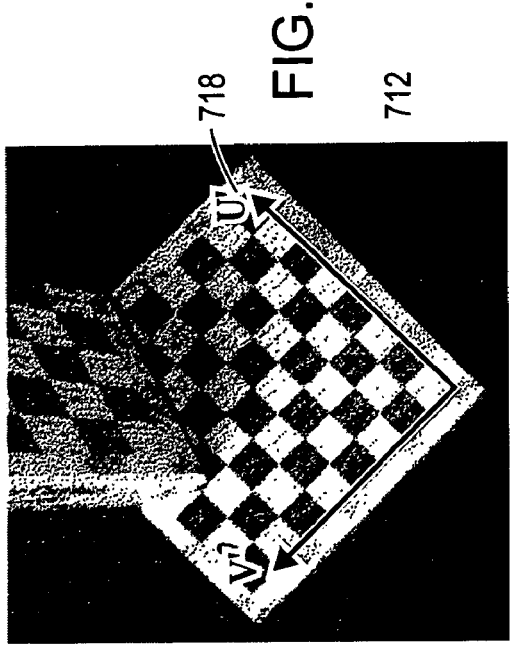
FIG. 7 illustrates the source and destination world planes in a 2-plane scenario, along with the determination of rotation angle and relative scale factor, in accordance with an embodiment of the invention.
Figure 7C:
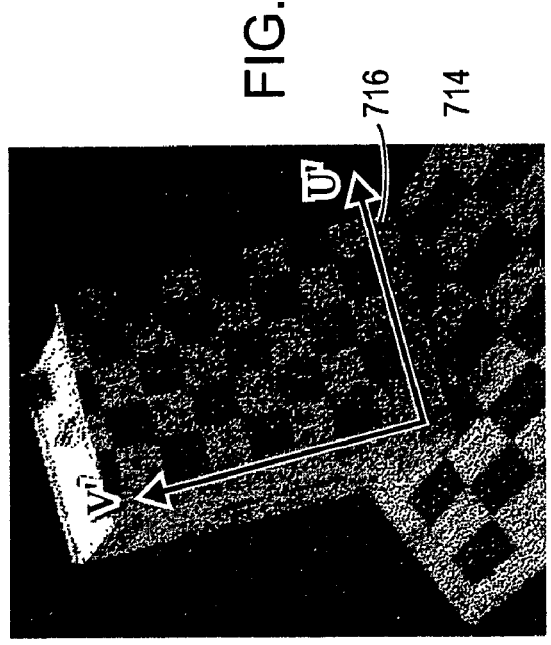

Determining $M_r$ for the 2-plane scenario is more complex since matrices $R_r$ and $S_r$ also need to be specified. To compute the rotation angle for $R_r(\theta)$, the angle between the horizontal axis of the source and the destination in the world plane is determined. A horizontal axis is computed by u'=Hu, where u' represents the direction of the vanishing point u at infinity in world-plane coordinates. With reference to FIG. 7, the destination plane 700 in the image is mostly vertical, and the world plane for the destination is given by u 702 and v 704. The source plane 706 in the image is mostly horizontal, and the world plane for the source is given by u 708 and v 710. The destination world plane 712 is shown in FIG. 7b, where $u'=H_d u$, and $v'=H_d v$. The source world plane 714 is shown in FIG. 7c, where by $u'=H_s u$, and $v'=H_s v$. The rotation angle θ is defined as the angle between the source horizontal axis (u'-axis 716) and the destination horizontal axis (u'-axis 718) in the world plane. In one embodiment, the user specifies these axes while tracing parallel lines for the homography, so no additional user input is necessary. The first set of parallel lines drawn is the u-axis, and the second set is the v-axis. Other methods of interactive specification are also feasible.

Figure 7A:
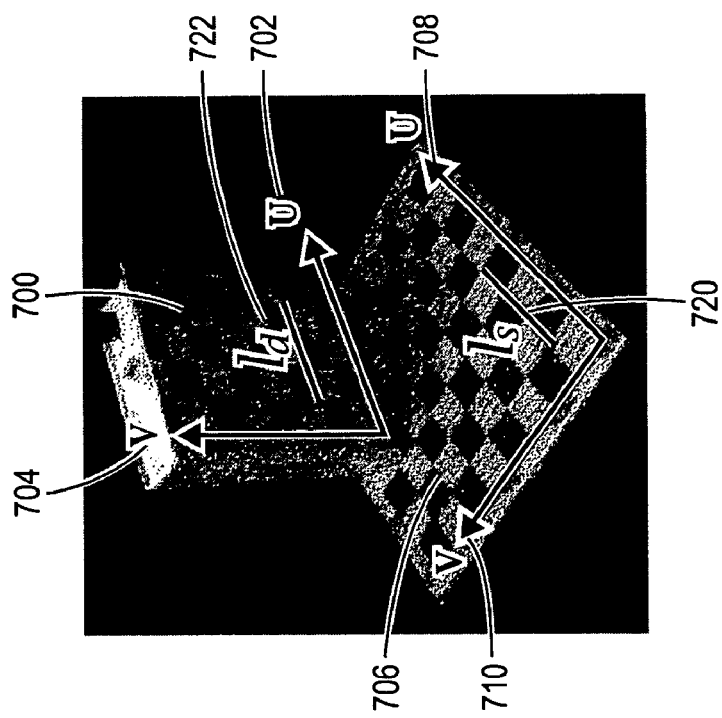

In one embodiment, the relative scale factor, $S_r(s)$, between the source and the destination planes (Equation (5)) is determined via a simple interface. The user draws two line segments to be of equal length in the world space, and the lengths of the line segments $l_s$ and $l_d$ are computed in the respective source and destination world planes. This is shown in FIG. 7a, where the user has drawn line segments $l_s$ 720 and $l_d$ 722 in respective source plane 706 and destination plane 704. Line segments $l_s$ 720 and $l_d$ 722 are each three chess-squares in length, and thus should represent an equal length in world space. A ratio is then determined that defines the relative scale factor, $s=l_s/l_d$. Determining $T_r$ is the same as in the 1-plane scenario. All the parameters in Equation (7) are now available, where $M_r=T_r(t_x, t_y)R(\theta)S(s)$.

Figure 8:
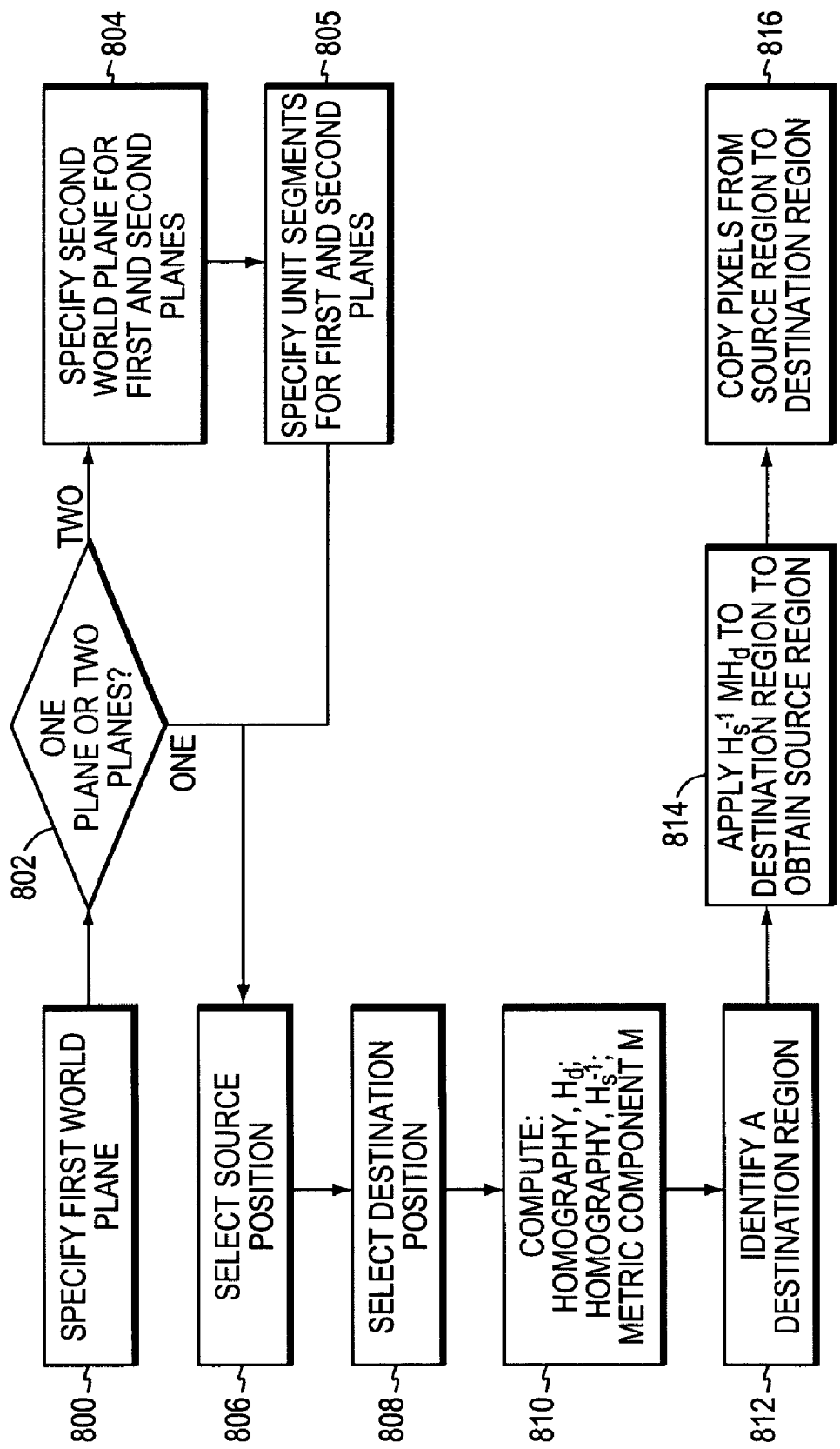
FIG. 8 is a flow diagram which illustrates a structure-preserving clone brush method, in accordance with one embodiment of the invention.

FIG. 8 is a flowchart illustrating a structure-preserving clone brushing method in one or two image planes, in accordance with an embodiment of the invention. The method begins by specifying a world plane in a specification step 800. This is typically performed by drawing two sets of parallel lines, as described above. The user decides if the structure-preserving clone brushing operation will take place in one plane, or in two planes in a decision step 802. If two planes are to be used, a second world plane is specified in a specification step 804. Specification step 804 is typically performed by drawing two sets of parallel lines. Unit lengths for both world planes are also specified in a length specification step 805.

The process continues by selecting a source position in a source selection step 806, and a destination position in a destination selection step 808. Using the plane information and the unit lengths, a metric component and homographies between the world planes and the image plane are computed in a computation step 810. If only one world plane is used, the homographies $H_s$ and $H_d$ are the same. The user then selects a destination region, typically by moving a cursor over the image, in a destination region selection step 812. The corresponding source region is obtained by applying the metric component and the homographies in an application step 814. The corresponding source region is then copied to the destination region in a copying step 816.

Another common problem in traditional clone brushing occurs due to intensity variations in the input image. Even if the materials or textures in the scene are the same, existing lighting conditions influence their color. Although the clone-brushed chessboard patterns are aligned, the intensity variations make the clone brushed region appear out of place.

In an embodiment of the invention, a triple of color-correction factors is computed—the red, green and blue color ratios from the source to the destination regions—which compensates for the intensity differences. A Gaussian-weighted average between sample regions of the source and destination images is used in computing the ratios. In a preferred embodiment, the ratios are computed during the initialization step (for example, when the source and destination positions are chosen) according to the current brush size. The user may alternatively select sample regions by drawing line segments that determine the position and radius. Other techniques of selecting sample color regions may be used.

Figure 9:
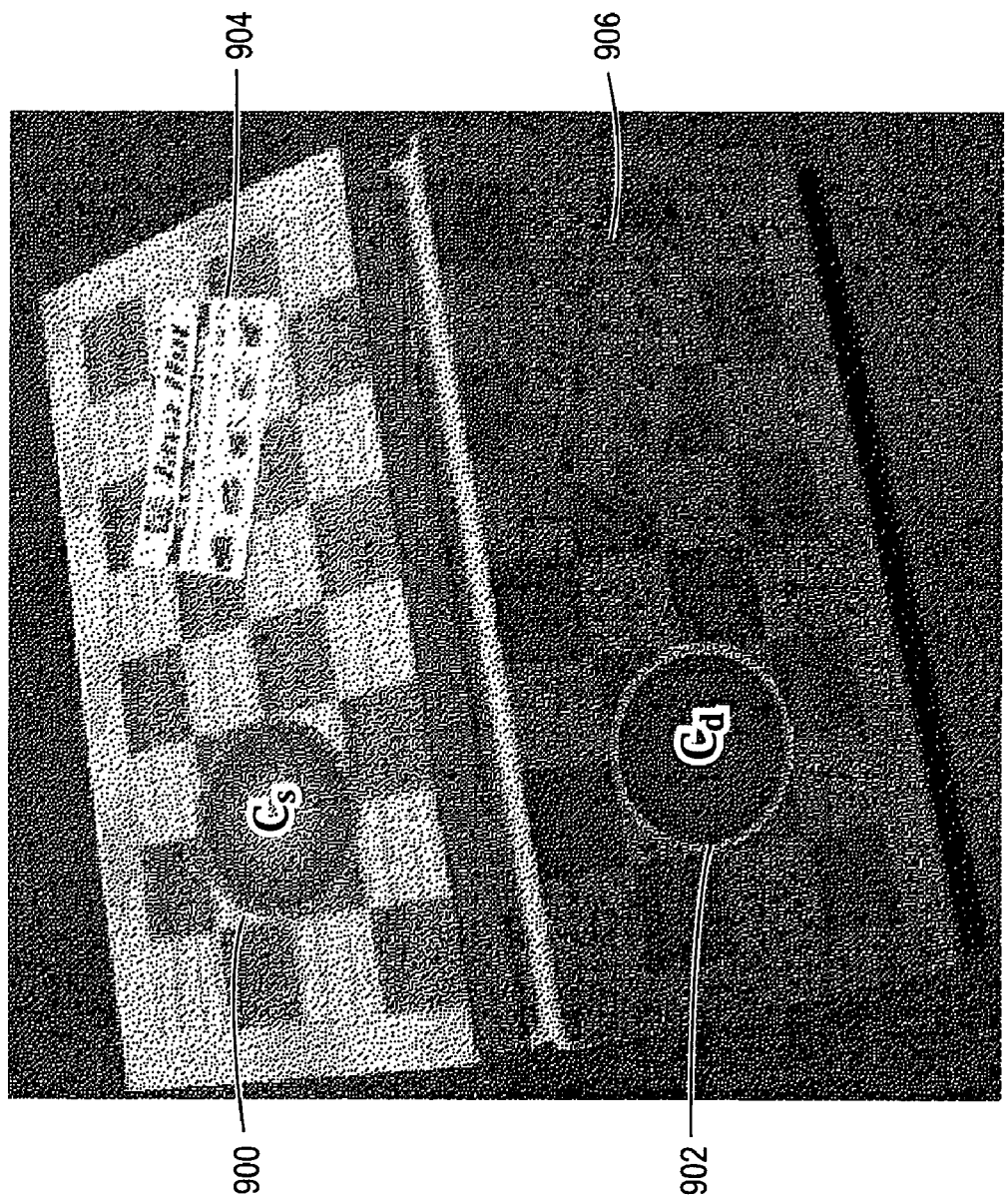
FIG. 9 illustrates color correction in a clone brush operation as used in a 2-plane scenario, in accordance with an embodiment of the invention.

The color correction method is described generally with reference to FIG. 9, where the user has defined source sample color region $c_s$ 900 and destination sample color region $c_d$ 902. The ratio of the average colors then serves as the correcting factor: each pixel component copied from the source region is multiplied by $c_d/c_s$ to compensate for the color difference. The paper in FIG. 9 has been clone brushed with color-correction from the source 904 to the destination 906.

In one embodiment of the invention, perspective-correction is used as described above, and the color correction factors are computed in the world plane using the homography matrices. The radius of the color-correction sample region then specifies an area in the world plane, rather than the image plane. The Gaussian weight is computed with respect to the worldplane distance. This is seen in FIG. 8, where the source sample color region $c_s$ 800 and destination sample color region $c_d$ 802 are ellipses of different size and orientation yet represent an equivalent area in world space.

Figure 10:
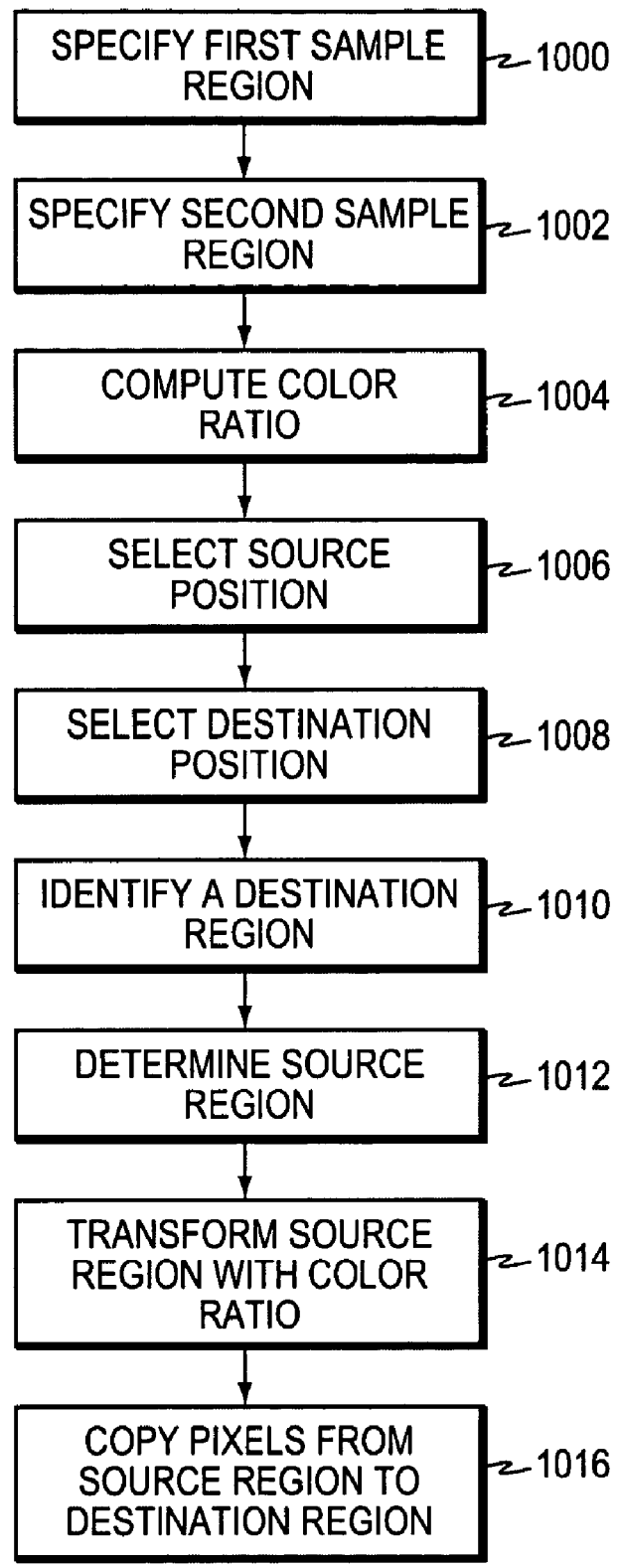
FIG. 10 is a flow diagram which illustrates a color correcting clone brush method, in accordance with an embodiment of the invention.

FIG. 10 is a flowchart illustrating a color-correcting method for use in a clone brushing operation, in accordance with an embodiment of the invention. The method begins by specifying a first color sample region in a specification step 1000, and specifying a second color sample region in a specification step 1002. The color ratio between the color sample regions is then computed in a computation step 1004. The process continues by selecting a source position in a source selection step 1006, and a destination position in a destination selection step 1008. The user then selects a destination region, typically by moving a cursor over the image, in a destination region selection step 1010. The corresponding source region is then determined in a source obtaining step 1012. The color of the corresponding source region is transformed by applying the color ratio in a color correcting step 1014. The transformed source region is then copied to the destination region in a copying step 1016.

Figure 11B:
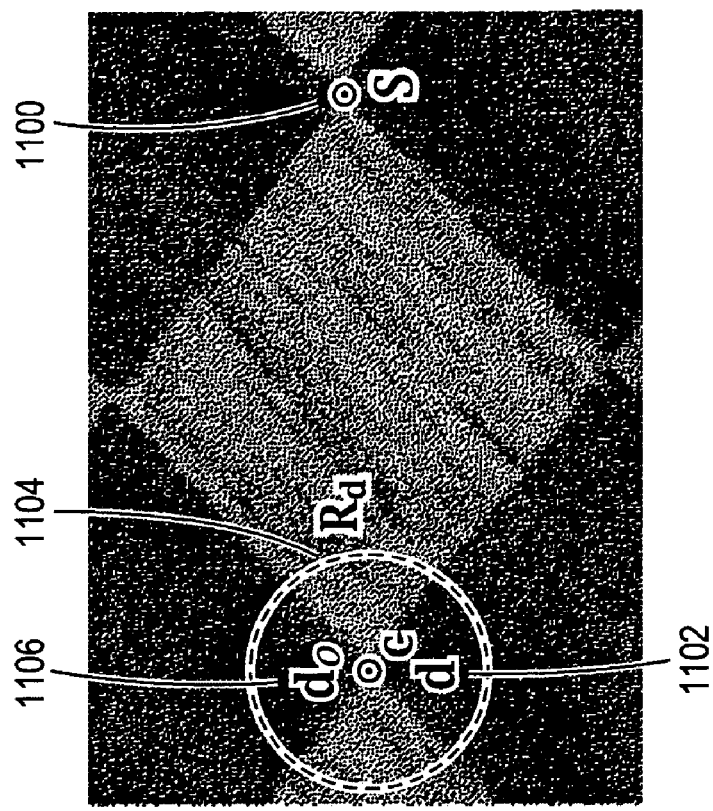
FIG. 11 illustrates the snapping of a destination position, in accordance with an embodiment of the invention.
Figure 11A:
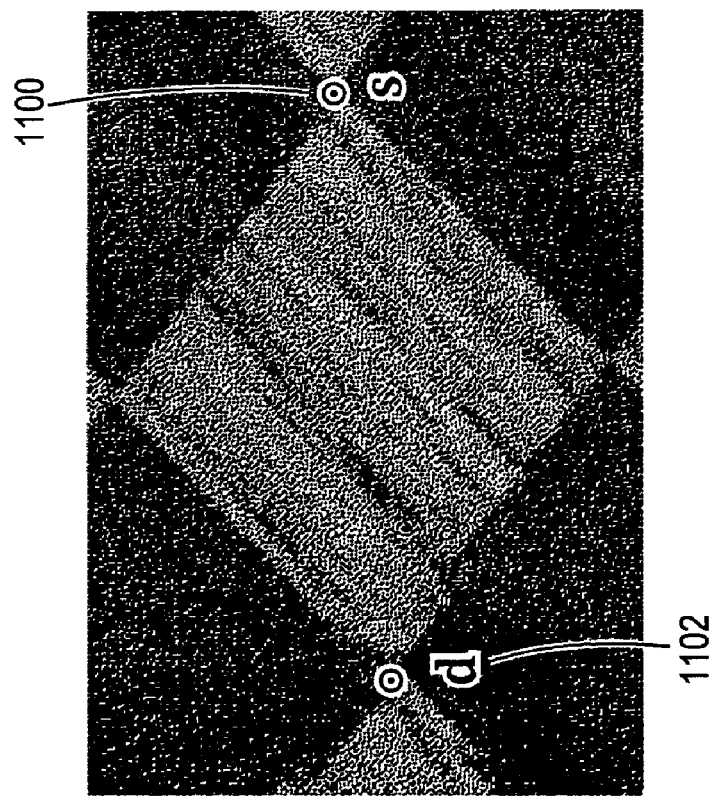

FIG. 11 illustrates a clone-brush snapping tool, as used in an embodiment of the invention. A common problem in traditional clone brushing occurs during the initialization step, when the user manually selects the initial source and destination points to specify the relative translation. Precise selection of these points is necessary, especially for images that have structured features, to avoid misalignment and noticeable artifacts around the seams of the clone brushed. In one embodiment, the present invention provides a method for searching for a more accurate destination point that is most similar to the initial source point. The user only needs to approximately click around the general area, and the closest matching point to the initial source point is automatically computed.

The method, as used in a preferred embodiment, is described with reference to FIG. 11. The user initially chooses a source position s 1100 and a destination position d 1102. A local region $R_d$ 1104 around the initial destination point d 1102 is searched for the closest matching point to s 1100. Each candidate destination point $x_d$ in the local region $R_d$ 1104 is compared to the source s 1100 by computing a color average for a local window centered around candidate $x_d$ and a color average for a local window centered around s 1100. The color average preferably is computed using a Gaussian-weighted color average. The color averages are compared, and the point $x_d \in R_d$ whose local window color average is closest to the color average for the local window around s is "snapped" and used as the new initial destination point, $d_0$ 1106. This comparison may be achieved by computing a Gaussian-weighted $L^2$ color difference between each candidate $x_d$ and s, and then snapping to the candidate with the least $L^2$ color difference. The Gaussian average is weighted from the center outwards, so pixels further from the center carry less weight in the average. The Gaussian-weighted average is then squared to obtain the $L^2$ value. Since the search space is small, a preferred embodiment uses an exhaustive search method, which finds $d_0$ almost instantaneously. In practice, allowing the local region $R_d$ to span 20 pixels by 20 pixels, and allowing the comparison windows around $x_d$ and s to span 16 pixels by 16 pixels produces favorable results: it takes 0.15 seconds for an exhaustive search using a Pentium III, 850 MHz machine. In alternative embodiments, other methods such as edge-detection may be used to compare candidate destination points with the source position. Additionally, metrics other than Gaussian-weighted $L^2$ color difference may be used in the comparison.

If the homography information is available, the Gaussian-weighted $L^2$ color difference is computed using Equation (7). By using the homographies, the comparison windows centered around $x_d$ and s may have different sizes and orientations in the image plane, but represent equal sizes and orientations in their respective world planes.

If the color-correction factor has been computed, as described above, color correction is applied while computing the $L^2$ difference by multiplying each pixel in the local window around s by the color correction factor $c_d/c_s$ prior to computing the Gaussian-weighted color average. Correcting color facilitates more accurate snapping when the source and destination positions are in differently lighted portions of the image.

Figure 12:
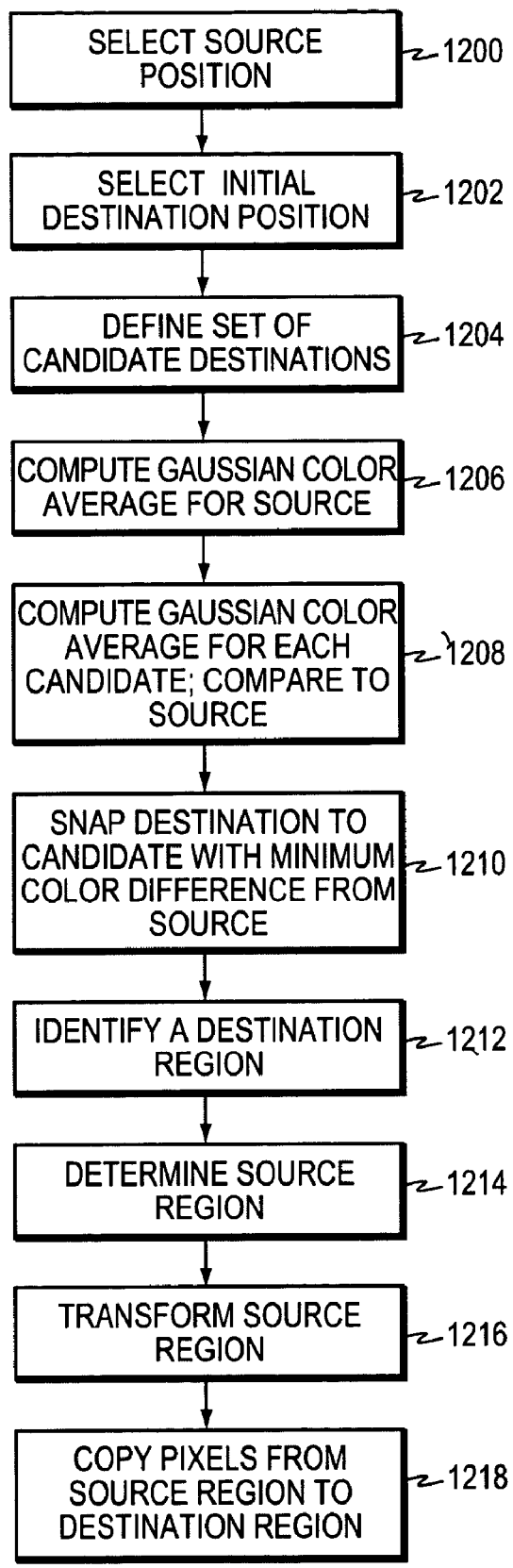
FIG. 12 is a flow diagram which illustrates a snapping method for a clone brush, in accordance with an embodiment of the invention.

FIG. 12 is a flowchart illustrating a snapping method for use in a clone brushing operation, in accordance with an embodiment of the invention. The method begins by selecting a source position in a source selection step 1200, and selecting an initial destination position in an initial destination selection step 1202. A set of candidate destinations is defined in a candidate definition step 1204. Candidate definition step 1204 is typically performed by identifying a region of pixels located near the initial destination position. The Gaussian weighted color average is computed for a small region of pixels around the source position in a source color averaging step 1206. For each candidate destination position, the Gaussian weighted color average is computed for a small region of pixels around the candidate, and the Gaussian weighted color average is compared to the computed color average for the source position, in a candidate color averaging and comparison step 1208. The candidate whose color average is most similar to that of the source position is "snapped" as the new destination position in a snapping step 1210. Clone brushing then continues with the identification of a destination region, typically by moving a cursor over the image, in a destination region selection step 1212. The corresponding source region is determined in a source obtaining step 1214. The corresponding source region is then copied to the destination region in a copying step 1216.

Figure 13:
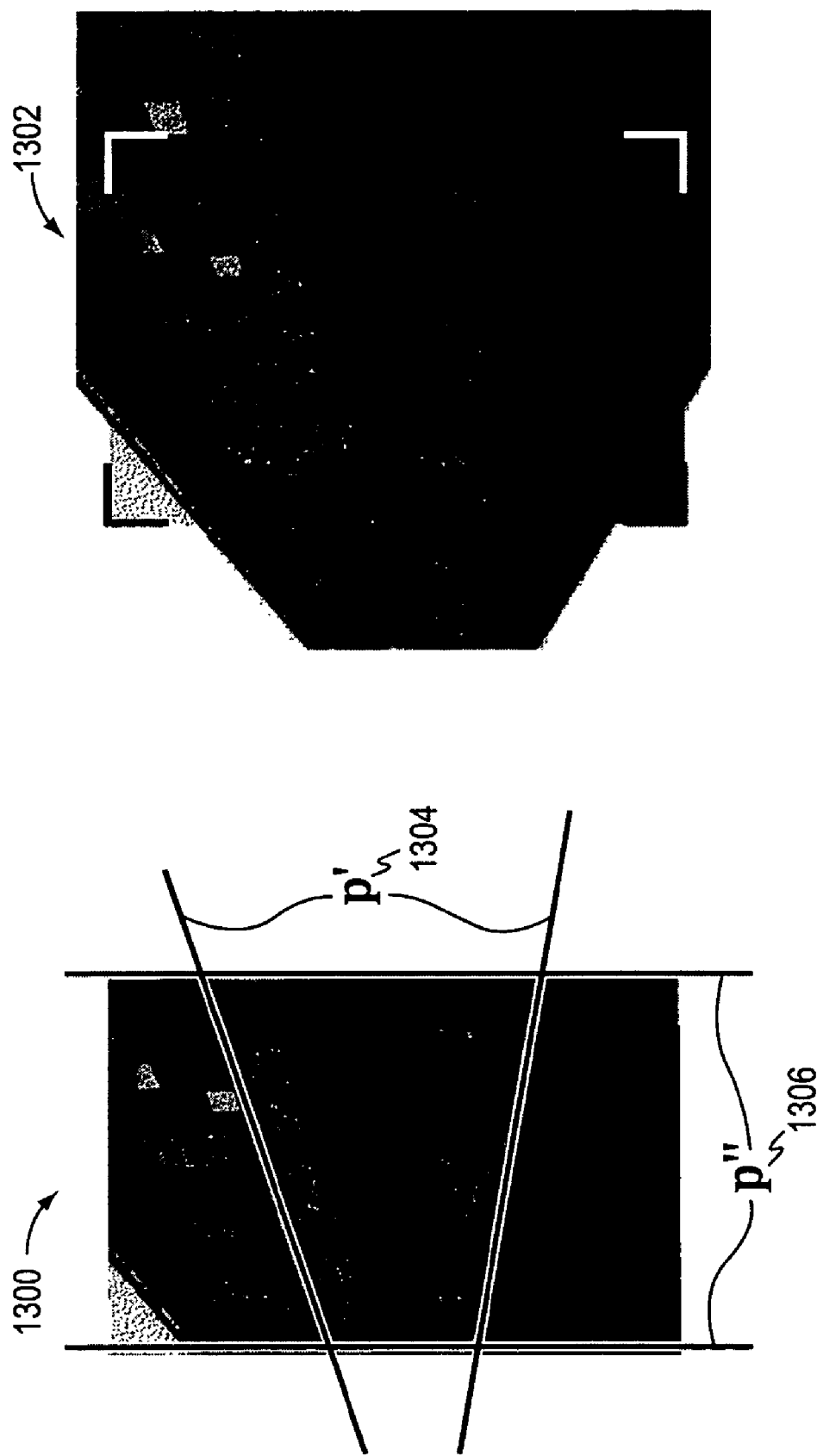
FIG. 13 illustrates an exemplary application of a structure-preserving clone brush, in accordance with an embodiment of the invention.

FIG. 13 shows an exemplary application of a structure-preserving clone brush, in accordance with an embodiment of the invention. The original image 1300 has been extended into a new image 1302 by copying portions of the image 1300 while maintaining consistency with perspective. The world plane has been defined in this example by the sets of parallel lines p' 1304 and p". In some embodiments, the functionality of the systems and methods described above can be implemented as software on a general purpose computer. In such an embodiment, the program can be written in any one of a number of high-level languages, such as FORTRAN, PASCAL, C, C++, LISP, JAVA, or BASIC. Further, the program can be written in a script, macro, or functionality embedded in commercially available software, such as VISUAL BASIC.

The program may also be implemented as a plug-in for commercially or otherwise available image editing software, such as ADOBE PHOTOSHOP. Additionally, the software could be implemented in an assembly language directed to a microprocessor resident on a computer. For example, the software could be implemented in Intel 80x86 assembly language if it were configured to run on an IBM PC or PC clone. The software can be embedded on an article of manufacture including, but not limited to, a "computer-readable medium" such as a floppy disk, a hard disk, an optical disk, a magnetic tape, a PROM, an EPROM, or CD-ROM.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer program product for clone-brushing in a 2D image, the computer program product comprising a computer readable medium having computer readable program code stored thereon, the computer readable program code including program code for: a) specifying a first world plane in the 2D image; b) providing a source position and a destination position in the 2D image; c) identifying a destination region in the 2D image relative to the destination position; d) determining a source region in the 2D image corresponding to the destination region in the 2D image including: defining a transformation that maps the destination position relative to the first world plane to the source position relative to the first world plane using a homography defined by the first world plane, and identifying pixels in the source region of the 2D image corresponding to pixels in the destination region of the 2D image using the transformation and the homography; e) transforming 2D image information of the source region relative to the first world plane to 2D image information of the destination region; and f) painting in the 2D image by copying the transformed 2D image information to the destination region.

2. The computer program product of claim 1, wherein specifying a first world plane in the 2D image comprises specifying two sets of parallel lines.

3. The computer program product of claim 1, wherein transforming 2D image information further comprises a bilinear interpolation of 2D image information in the source region relative to the first world plane.

4. The computer program product of claim 1 further comprising program code for: providing a first color sample region for the source region;
providing a second sample color region for the destination region; and
computing a color ratio between the first color sample region and the second color sample region, wherein transforming 2D image information further comprises applying the color ratio to the 2D image information of the source region.

5. The computer program product of claim 4, wherein the color ratio is computed using Gaussian weighted averages of the first and second sample color regions.

6. The computer program product of claim 4, wherein the first color sample region is provided with respect to the first world plane.

7. The computer program product of claim 1, further comprising program code for specifying a second world plane and a relative scale factor in the 2D image, wherein: determining a source region in the 2D image comprises determining a source region in the 2D image relative to the first world plane and corresponding to the destination region relative to the second world plane and the relative scale factor; and transforming 2D image information comprises transforming the 2D image information of the source region relative to the first world plane to 2D image information of the destination region relative to the second world plane and the relative scale factor.

8. The computer program product of claim 7, wherein specifying the second world plane comprises specifying two sets of parallel lines.

9. The computer program product of claim 7, wherein specifying the relative scale factor comprises specifying a line segment of unit length relative to the first world plane and specifying a line segment of unit length relative to the second world plane.

10. A computer program product according to claim 1, wherein the destination position is a snapped destination position.

11. The computer program product of claim 10, wherein determining a snapped destination position comprises searching a collection of candidate destination positions.

12. A computer program product defined by claim 1, wherein the first world plane in the 2D image is not parallel to the plane containing the 2D image.

13. A computer program product defined by claim 12, wherein specifying a first world plane in the 2D image comprises specifying two sets of parallel lines.

14. A computer program product defined by claim 12, wherein transforming 2D image information further comprises a bilinear interpolation of 2D image information in the source region relative to the first world plane.

15. A computer program product defined by claim 12 further comprising program code for: providing a first color sample region for the source region; providing a second sample color region for the destination region; and computing a color ratio between the first color sample region and the second color sample region, wherein transforming 2D image information further comprises applying the color ratio to the 2D image information of the source region.

16. A computer program product defined by claim 15, wherein the color ratio is computed using Gaussian weighted averages of the first and second sample color regions.

17. A computer program product defined by claim 15, wherein the first color sample region is provided with respect to the first world plane.

18. A computer program product defined by claim 12, further comprising program code for specifying a second world plane and a relative scale factor in the 2D image, wherein: determining a source region in the 2D image comprises determining a source region in the 2D image relative to the first world plane and corresponding to the destination region relative to the second world plane and the relative scale factor; and transforming 2D image information comprises transforming the 2D image information of the source region relative to the first world plane to 2D image information of the destination region relative to the second world plane and the relative scale factor.

19. A computer program product for clone-brushing in a 2D image, the computer program product comprising a computer readable medium having computer readable program code stored thereon, the computer readable program code including program code for: providing a source position in the 2D image; providing a destination position in the 2D image; identifying a destination region in the 2D image relative to the destination position; determining a source region in the 2D image corresponding to the destination region; providing a first color sample region in the source region; providing a second color sample region in the destination region; computing a color ratio between the first color sample region and the second color sample region; applying the color ratio to 2D image information of the source region and transforming the 2D image information of the source region to 2D image information of the destination region; and painting by copying the transformed 2D image information to the destination region.

20. The computer program product of claim 19, wherein the color ratio is computed using Gaussian weighted averages of the first and second sample color regions.

21. A computer program product for clone-brushing in a 2D image, the computer program product comprising a computer readable medium having computer readable program code stored thereon, the computer readable program code including program code for: a) providing a source position in the 2D image; b) providing an initial destination position in the 2D image; c) determining a snapped destination position; d) identifying a destination region in the 2D image relative to the snapped destination position; e) determining a source region in the 2D image corresponding to the destination region; f) transforming 2D image information of the source region to 2D image information of the destination region; and g) painting by copying the transformed 2D image information to the destination region, wherein determining a snapped destination position comprises searching a collection of candidate destination positions and wherein determining a snapped destination position further comprises applying a quality metric to the source position, applying the quality metric to the candidate destination positions, and determining a snapped destination position from the collection of candidate destination positions whose quality is similar to the quality of the source position.

22. The computer program product of claim 21, wherein the quality metric is a Gaussian-weighted color average for a region surrounding the position.

23. The computer program product of claim 21, wherein the quality metric compensates for regional color variation by applying a color ratio.

24. A clone-brushing method of painting in a 2D image, the method comprising: a) specifying a first world plane in the 2D image; b) providing a source position and a destination position in the 2D image; c) identifying a destination region in the 2D image relative to the destination position; d) determining a source region in the 2D image corresponding to the destination region in the 2D image including: defining a transformation that maps the destination position relative to the first world plane to the source position relative to the first world plane using a homography defined by the first world plane, and identifying pixels in the source region of the 2D image corresponding to pixels in the destination region of the 2D image using the transformation and the homography; e) transforming 2D image information of the source region relative to the first world plane to 2D image information of the destination region; and f) painting in the 2D image by copying the transformed 2D image information to the destination region, wherein the first world plane in the 2D image is not parallel to the plane containing the 2D image.

25. A method according to claim 24, wherein specifying a first world plane in the 2D image comprises specifying two sets of parallel lines.

26. A method according to claim 24, wherein transforming 2D image information further comprises a bilinear interpolation of 2D image information in the source region relative to the first world plane.

27. A method according to claim 24 further comprising: providing a first color sample region for the source region; providing a second sample color region for the destination region; and computing a color ratio between the first color sample region and the second color sample region, wherein transforming 2D image information further comprises applying the color ratio to the 2D image information of the source region.

28. A method according to claim 27, wherein the color ratio is computed using Gaussian weighted averages of the first and second sample color regions.

29. A method according to claim 27, wherein the first color sample region is provided with respect to the first world plane.

30. A method according to claim 24, further comprising specifying a second world plane and a relative scale factor in the 2D image, wherein: determining a source region in the 2D image comprises determining a source region in the 2D image relative to the first world plane and corresponding to the destination region relative to the second world plane and the relative scale factor; and transforming 2D image information comprises transforming the 2D image information of the source region relative to the first world plane to 2D image information of the destination region relative to the second world plane and the relative scale factor.

31. A method according to claim 30, wherein specifying the second world plane comprises specifying two sets of parallel lines.

32. A method according to claim 30, wherein specifying the relative scale factor comprises specifying a line segment of unit length relative to the first world plane and specifying a line segment of unit length relative to the second world plane.

* * * * *